April 28, 1959  L. E. SNODGRASS  2,884,259
VELOCIPEDE PROPELLED BY FOOT PEDALS AND HAND LEVERS
Filed Dec. 19, 1957

INVENTOR
L. E. Snodgrass
BY Cecil L. Wood
ATTORNEY

United States Patent Office 2,884,259
Patented Apr. 28, 1959

2,884,259

VELOCIPEDE PROPELLED BY FOOT PEDALS AND HAND LEVERS

Leslie E. Snodgrass, Port Isabel, Tex.

Application December 19, 1957, Serial No. 703,797

3 Claims. (Cl. 280—234)

This invention relates to a hand and foot propelled vehicle, and it concerns more particularly a tricycle or similar vehicle which is capable of being propelled with the hands as well as the feet.

An object of the invention is to provide a motorless vehicle which is capable of being propelled at a high rate of speed by use of both the hands and the feet, and having, in combination with a pair of pedal operable crank levers acting on one or more of the wheels of the vehicle through a system of chains and sprockets, a pair of manually operable levers acting on the crank levers whereby the action of the feet is supplemented by that of the hands in propelling the vehicle.

Another object of the invention is to provide, in a vehicle of the type described, steering means comprising, in combination with the manually operable levers above referred to, each of the levers including an elongated tubular member fulcrumed at its lower end, a shaft disposed concentrically within the tubular member and extending above and below it, and a handle connected to the upper end of the shaft, a universal joint connected to the lower end of the shaft and linkage connected to the universal joint and acting upon one or more of the wheels of the vehicle, to steer the vehicle, upon rotation of the shaft about its axis by manipulation of the handle.

The invention will be readily understood by referring to the following description and the accompanying drawing, in which.

Figure 1:
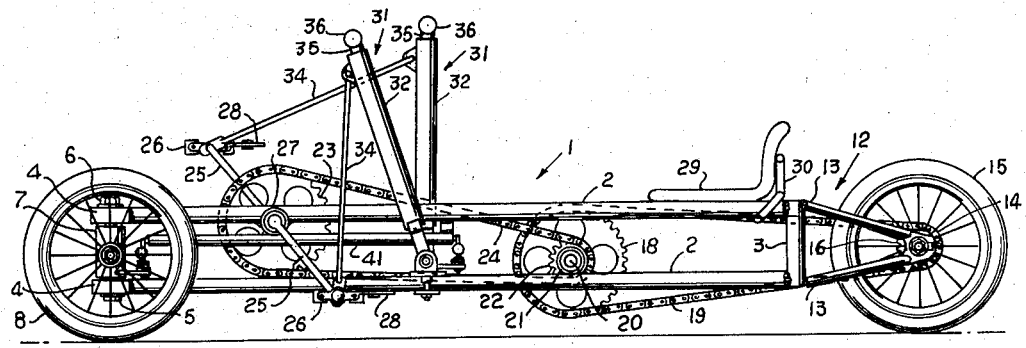
Figure 1 is a side elevational view of a vehicle embodying the invention.
Figure 2:
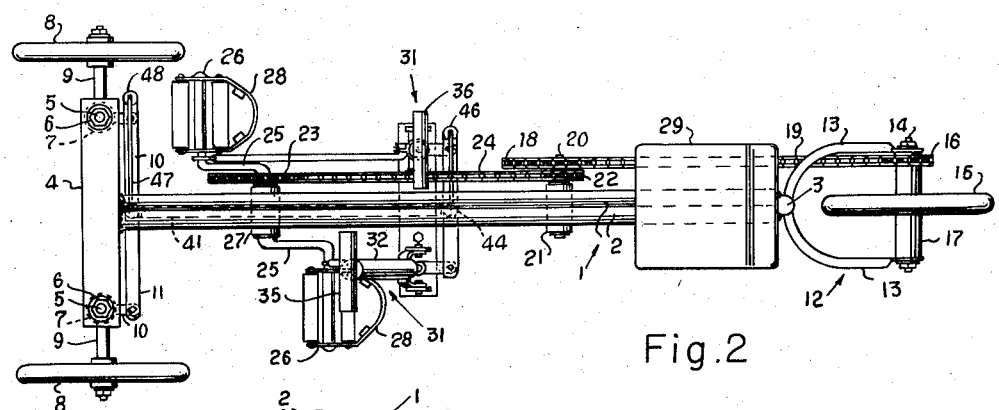
Figure 2 is a top plan view.
Figure 3:
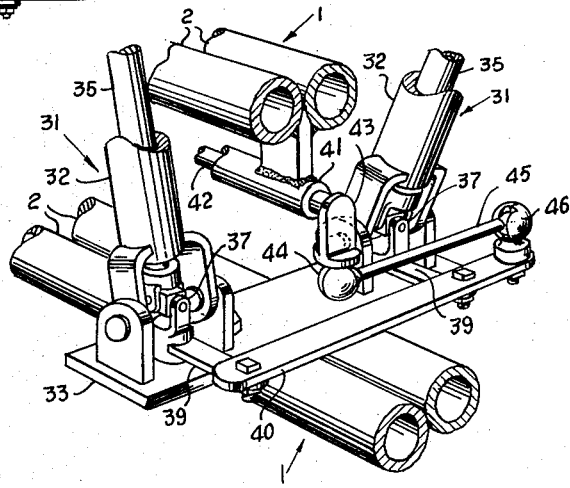
Figure 3 is a fragmentary perspective view, on an enlarged scale.

Referring to the drawing, the apparatus of the invention comprises a frame, designated generally by the numeral 1, which includes two pairs of elongated tubular members 2. The tubular members 2 of each pair are arranged in juxtaposed, parallel relation to each other, and the two pairs of tubular members 2 are spaced one above the other.

The tubular members 2 are connected at one end to opposite ends of a vertically disposed tubular member 3, which is positioned rearwardly of the vehicle. The opposite ends of the tubular members 2 are connected, respectively, to middle portions of a pair of vertically spaced horizontal bars 4 which are disposed transversely relative to the center line of the vehicle adjacent its forward end.

The bars 4 are connected adjacent their ends by a pair of vertically disposed pins 5, each of which is threaded at one end for engagement by a nut 6. A pair of vertically disposed tubular members 7 are each positioned between the bars 4, surrounding one of the pins 5. A pair of bushings (not shown), each of which surrounds one of the pins 5 and is positioned between the pin 5 and the adjacent tubular member 7, serve as spacers for the bars 4 and as bearings for the tubular members 7.

A pair of wheels 8 are mounted on stub axles 9, each of which is connected at one end to one of the tubular members 7. A pair of steering arms 10 are each connected at one end to one of the tubular members 7, and extend outwardly therefrom at right angles to the axles 9. The opposite ends of the steering arms 10 are each pivotally connected to a tie rod 11.

A fork 12 is formed by two pairs of tubular members 13, which are connected at one end to opposite ends of the tubular member 3. The tubular members 13 are curved intermediate their ends and extend outwardly and rearwardly from the tubular member 3. The tubular members 13 of each pair are joined at their outer ends for engagement by opposite ends of an axle 14, on which a wheel 15 is journaled. A sprocket 16 is connected to the hub of the wheel 15, which is indicated by the numeral 17.

A sprocket 18, which is of larger diameter than the sprocket 16, is connected thereto by a chain belt 19 whereby the sprocket 16 is driven by the sprocket 18. The sprocket 18 is connected to one end of a shaft 20, which is journaled in a bearing 21 mounted on the lower tubular members 2.

A sprocket 22, which is of smaller diameter than the sprocket 18, is connected to the shaft 20 and turns with it. A sprocket 23, which is of larger diameter than the sprocket 22, is connected thereto by a chain belt 24 whereby the sprocket 22 is driven by the sprocket 23. A pair of crank levers 25, each of which has a pedal 26 connected to one end thereof, are formed integrally with the sprocket 23. The crank levers 25 and the sprocket 23 have a common shaft which is journaled in a bearing 27 mounted on the upper tubular members 2.

A clip 28 is attached to each of the pedals 26 for engagement by the foot, whereby the foot is prevented from slipping off the pedal 26 and striking the ground while traveling at high speed.

A seat 29, which includes a back rest against which pressure may be applied in propelling the vehicle, is supported upon the upper tubular members 2. The seat 29 is adjustable longitudinally relative to the tubular members 2 by a locking device 30, which straddles the tubular member 2 and selectively engages the teeth of a rack bar (not shown) attached to the under side thereof.

A pair of manually operable levers 31 each comprise an elongated tubular member 32, which is pivotally connected at one end to a bracket 33 supported upon the lower tubular members 2. The tubular members 32 are each pivotally connected at its opposite end to one end of a pitman 34, which is pivotally connected at its opposite end to the end of one of the crank levers 25 to which the adjacent pedal 26 is connected, whereby the crank levers 25 are operable in response to the action of the manually operable levers 31.

A pair of shafts 35 are disposed concentrically within the respective tubular members 32, and extend above and below the ends thereof. Each of the shafts 35 has a handle 36 connected to its upper end and a universal joint 37 connected to its lower end. The universal joints 37 are each rigidly connected at one end to one end of a bar 39. The bars 39 are capable of being swung about their connected ends upon rotation of the shafts 35, by manipulation of the handles 36. The opposite ends of the bars 39 are each pivotally connected to a tie rod 40.

An elongated sleeve 41 is positioned below the upper tubular members 2, in alignment with the longitudinal center line of the vehicle, and is rigidly connected to the tubular members 2. A shaft 42 is disposed concentrically within the sleeve 41, and extends beyond the ends thereof. An arm 43, which is rigidly connected at one end to one end of the shaft 42, is connected by a ball joint 44 to one end of a link 45. The opposite end of the link 45 is connected by a ball joint 46 to one end of the tie rod 40, whereby the shaft 42 is capable of being rotated about its axis upon rotation of the shafts 35, or either of them.

An arm rigidly connected to the opposite end of the shaft 42, which corresponds to the arm 43, is connected by a ball joint to one end of a link 47. The opposite end of the link 47 is connected by a ball joint 48 to one end of the tie rod 11, whereby the vehicle is capable of being steered by rotation of the shafts 35, or either of them, by manipulation of the handles 36, which also control the operation of the levers 31 whereby the vehicle is propelled.

The invention may be modified in various ways without departing from the spirit and scope thereof.

What is claimed is:

1. In a wheeled vehicle having a first sprocket drivingly connected to one or more wheels of the vehicle, a pedal operated second sprocket, and means drivingly connecting said sprockets whereby said first sprocket is driven by said second sprocket, a pair of manually operated levers each including an elongated tubular member fulcrumed at its lower end and connected by a pitman to the second sprocket whereby the action of the feet on said pedal is supplemented by that of the hands in propelling the vehicle, a shaft disposed concentrically within each of the tubular members and extending above and below it, each of said shafts having a handle connected to its upper end and a universal joint connected to its lower end, and linkage means operatively connected to said respective universal joints and acting upon one or more of the wheels of the vehicle, to steer the vehicle, upon rotation of either of said shafts about its axis by manipulation of its handle, said linkage means comprising parallel bars rigidly secured at one end to the lower ends of said shafts and rotatable therewith, a tie rod pivotally connected to the other ends of said bars, a rotatable shaft extending longitudinally of said vehicle for turning at least one wheel of said vehicle, a lever arm connected to one end of said longitudinal shaft, and a rigid link connected by a ball and socket joint at one end to said lever arm and at its other end to said tie rod.

2. Apparatus according to claim 1 in which said longitudinal shaft is rotatably received within a tubular sleeve throughout substantially its entire length.

3. Apparatus according to claim 2 in which said rigid link is connected to one end of said tie rod.

References Cited in the file of this patent

UNITED STATES PATENTS

| | | |
|---|---|---|
| 1,405,660 | Berglund | Feb. 7, 1922 |
| 1,630,442 | Makris | May 31, 1927 |

FOREIGN PATENTS

| | | |
|---|---|---|
| 340,353 | Italy | May 12, 1936 |
| 16,274 | Sweden | Oct. 21, 1902 |